(12) United States Patent
Zhang (10) Patent No.: US 10,348,928 B2
(45) Date of Patent: Jul. 9, 2019

(54) FACSIMILE COMMUNICATION

(71) Applicant: Hewlett-Packard Development Company, L.P., Houston, TX (US)

(72) Inventor: Jian-Qun Zhang, Shanghai (CN)

(73) Assignee: Hewlett-Packard Development Company, L.P., Spring, TX (US)

( * ) Notice: Subject to any disclaimer, the term of this patent is extended or adjusted under 35 U.S.C. 154(b) by 119 days.

(21) Appl. No.: 15/454,532

(22) Filed: Mar. 9, 2017

(65) Prior Publication Data

US 2018/0262643 A1    Sep. 13, 2018

(51) Int. Cl.
| | |
|---|---|
| *G06F 15/00* | (2006.01) |
| *H04N 1/333* | (2006.01) |
| *H04N 1/32* | (2006.01) |
| *H04N 1/327* | (2006.01) |
| *H04L 29/08* | (2006.01) |

(52) U.S. Cl.
CPC ......... *H04N 1/33369* (2013.01); *H04L 67/10* (2013.01); *H04L 67/141* (2013.01); *H04N 1/32641* (2013.01); *H04N 1/32673* (2013.01); *H04N 1/32765* (2013.01); *H04N 2201/0093* (2013.01); *H04N 2201/3335* (2013.01)

(58) Field of Classification Search
CPC ........... H04N 1/33369; H04N 1/32641; H04N 1/32673; H04N 1/32765; H04L 67/10; H04L 67/141
USPC ...................................................... 358/412
See application file for complete search history.

(56) References Cited

U.S. PATENT DOCUMENTS

| | | | |
|---|---|---|---|
| 4,606,044 A | 8/1986 | Kudo | |
| 5,001,571 A * | 3/1991 | Murano | ................ H04L 1/0007 |
| | | | 358/434 |
| 5,021,890 A | 6/1991 | Yoshida et al. | |
| 5,721,731 A | 2/1998 | Yoshida | |
| 5,805,301 A | 9/1998 | Rasanen | |
| 7,075,682 B1 | 7/2006 | Eguchi et al. | |
| 7,639,384 B2 | 12/2009 | Lee et al. | |
| 8,422,062 B2 | 4/2013 | Gajadevasangary et al. | |
| 2010/0208726 A1 | 8/2010 | Oliszewski et al. | |
| 2013/0271782 A1 * | 10/2013 | Ashmore | ........... H04N 1/33369 |
| | | | 358/1.14 |

OTHER PUBLICATIONS

DIALOGIC ~ Considerations for Using T.38 Versus G.711 for Fax Over IP, 2011, White Paper ~ 19 pages.

* cited by examiner

*Primary Examiner* — Mark R Milia
(74) *Attorney, Agent, or Firm* — HP Inc. Patent Department (57) ABSTRACT

Examples to facilitate facsimile communication are described herein. In an example, on receiving a communication error for a call session, values of communication parameters to be used for another call session, which is subsequent to the call session for which the communication error is received, may be determined. The communication parameter may be, for instance, a transmission rate and an error correction mode (ECM). The values of the communication parameters in the subsequent call session may be determined, based on values of these parameters in a previous call session(s), i.e., the call session for which the communication error is received. Further, a communication channel may be established using the determined values of the communication parameters.

15 Claims, 7 Drawing Sheets

FACSIMILE COMMUNICATION

BACKGROUND

With the recent advances in technology, communication systems, wired or wireless, may transmit data using facsimile or fax communication. Facsimile based communication generally involves transmission of data over a network, for instance, to a telephone number associated with a communication system. Since the data transmission is over a network, conditions of the network at receiver as well as sender end may affect quality and success rate of the data transmission. In certain cases, impaired network conditions may result in a data transmission failure.

BRIEF DESCRIPTION OF FIGURES

The following detailed description references the drawings, wherein.

DETAILED DESCRIPTION

Facsimile based communication is generally used for transmission of data, such as a digital image of a document, from a sender system to a receiver system. The sender device may generate the digital image, which is transmitted to the receiver device, where the digital image may be printed to generate a duplicate copy of the original. The data transmission may be over a wired network or a wireless network.

Such data transmission is largely based on network conditions. While appropriate network conditions result in a higher data transmission success rate, impaired network conditions may result in either a low transmission rate or data transmission failure. The network conditions may in turn be dependent on a quality of network infrastructure, and it may not always be possible to upgrade network infrastructure owing to various issues, such as cost related aspects. Further, inability of the communication systems to dynamically adapt to real-time network conditions may also prevent successful transmission of data. As a result, the receiver may not receive the data until the sender resends the data. Thus, the data transmission failure may not only hinder user experience but in certain cases may also result in loss of data.

Approaches for facilitating communication in communication systems are described. In an example, a communication system may send or receive data using facsimile based communication mechanisms. In case a communication error message indicating data communication failure is received, the communication system may be dynamically configured to adapt to current network conditions to facilitate communication. In one example, the dynamic configuration may involve alteration of facsimile communication parameters, (hereinafter referred to as communication parameters) to facilitate facsimile communication.

The communication parameters may include a transmission rate and an error correction mode (ECM). Transmission rate may be understood as a rate or speed at which data may be transmitted. For the sake explanation, based on rate at which data is transmitted the transmission rates may be classified into high range transmission rate, such as V.34, medium range transmission rates, such as V.17, and low range transmission rates, such as V.29 and V.27A. It would be noted that higher transmission rate may not always ensure successful data transmission, while a lower transmission rate may not always indicate inefficient data transmission. For instance, lower transmission rates may be able to get through flat or white noise due to comparatively less complex training pattern as compared high transmission rates, while high transmission rates may be able to get through spike or sudden noise.

ECM may be understood to be a transmission mode for coping with communication errors due to noise in network lines. ECM may pertain to detection and correction of the communication errors in a facsimile transmission process. The ECM be either enabled or disabled. When the ECM is enabled, a determination is made to check if a received page has any errors. In case there are errors present, the effected communication may be resent. Though, when enabled, ECM provides for correction of errors, in certain cases it may result in a failure to establish a communication channel. For example, in case of noisy transmission channels with flat noise, with ECM enabled, retransmissions may take substantial time, which may cause communication procedure to time out.

In one example, the communication parameters may be altered to establish a communication channel for data communication. The communication parameters may be initially set for call sessions in a communication cycle, based on a predetermined setting. The communication cycle may include a predefined number of call sessions during which data is exchanged. For instance, in case data is successfully transmitted or received in the first attempt, the communication channel may include a single call session. However, in case of communication failure, if further attempts are made to share data, the communication cycle may include multiple call sessions. During each call session, the communication channel may be established based on the values of the communication parameters.

In one example, in the event of data communication failure in a current call session, the values of the communication parameters may be re-set for a subsequent call session, where the communication channel may have to be re-established to facilitate communication. For determining the values of the communication parameters for the subsequent call session, a value of each of the communication parameter in the call session for which communication error was received, may be obtained. Further, based on the obtained values, the values of the communication parameter for the subsequent call session may be determined.

The obtained values may be compared with predefined values in a predetermined setting. The values of the communication parameter in the predetermined setting may be selected such that the type of noise that may be present in the network may be factored in while determining values of communication parameters for subsequent call sessions. On determining the values of the communication parameter for the subsequent call session, a communication channel with the determined communication parameters may be established for data communication.

Thus, the present subject matter facilitates dynamic alteration of the communication parameters for adapting to real-time network conditions, thereby facilitating data communication even in noisy networks. The communication parameters may be altered with minimum or without human intervention to address the noise, which may be present in the network. Accordingly, data loss due to transmission failures may also be reduced and user experience may be enhanced. Further, as, no additional hardware changes may be made to the communication systems and network infrastructure, the data communication may be facilitated in a cost effective manner.

The following detailed description refers to the accompanying drawings. Wherever possible, the same reference numbers are used in the drawings and the following description to refer to the same or similar parts. While several examples are described in the description, modifications, adaptations, and other implementations are possible. Accordingly, the following detailed description does not limit the disclosed examples. Instead, the proper scope of the disclosed examples may be defined by the appended claims.

Figure 1:
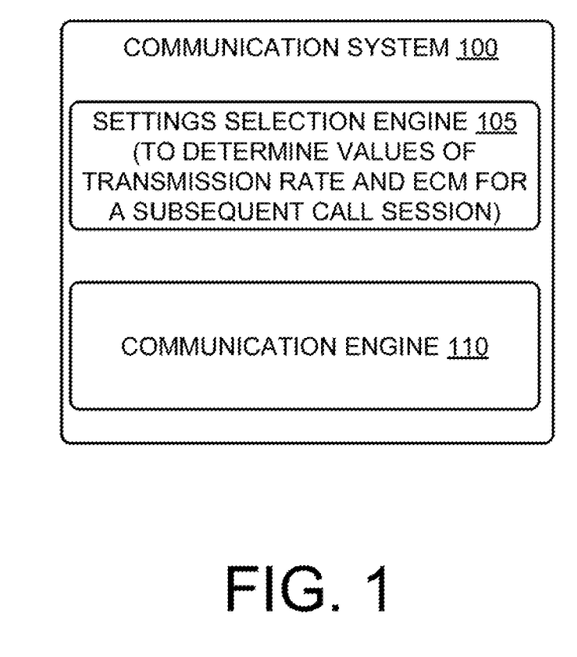
FIG. 1 illustrates a block diagram of a communication system, according to an example implementation of the present subject matter.

FIG. 1 illustrates a block diagram of a communication system 100, according to an example implementation of the present subject matter. In an example, the communication system 100 may communicate with another communication (not shown in figures) over a communication network (not shown in figures) for facsimile based data communication.

The communication network may be a wireless network, a wired network, or a combination thereof. The communication networks can also be an individual network or a collection of many such individual networks, interconnected with each other and functioning as a single large network, e.g., the Internet or an intranet, and can be implemented as any of the different types of networks, such as intranet, local area network (LAN), wide area network (WAN), and such. The communication network may also include individual networks, such as but not limited to, Global System for Communication (GSM) network, Universal Telecommunications System (UMTS) network, Long Term Evolution (LTE) network, etc.

Using the communication network, the communication system 100 may send data to or receive data from another communication system. The data may include, for instance, a digital image of a document, such as a print media. To share the data, a communication channel may be established between the two communication systems for each call session. The communication channel may be established, based on values of communication parameters, such as transmission rate and ECM.

Generally, most of the communication systems using facsimile communication use a high range transmission rate, such as V.34, as their default setting. The default settings may, however, fail to establish communication in certain network conditions. According to an aspect of the present subject matter, the communication system 100 provides for determining appropriate values of the communication parameters for a call session to address network conditions in real-time.

In an example, on receiving a communication error for a call session, the communication parameters for another call session subsequent to the call session for which the communication error is received, may be determined. To determine the values, the communication system 100 includes, amongst other components, a settings selection engine 105 and a communication engine 110. The settings selection engine 105 determines values of the communication parameters for a subsequent call session. To facilitate communication in such a scenario, the settings selection engine 105 may obtain values of the communication parameters for a previous call session, which is the call session for which the communication error is received. In other examples, the communication parameters for multiple call sessions in a communication cycle may be obtained.

Based on the obtained values, the settings selection engine 105 may determine values of each of the communication parameter for a subsequent call session. For instance, based on the values of the previous call session(s), the settings selection engine 105 may determine whether a higher or a lower transmission rate is to be used, or whether the ECM is to be enabled or disabled for the subsequent call session. Accordingly, the communication engine 110 may set the communication parameters for the subsequent call session to aid successful data communication in the subsequent call session.

Figure 2:
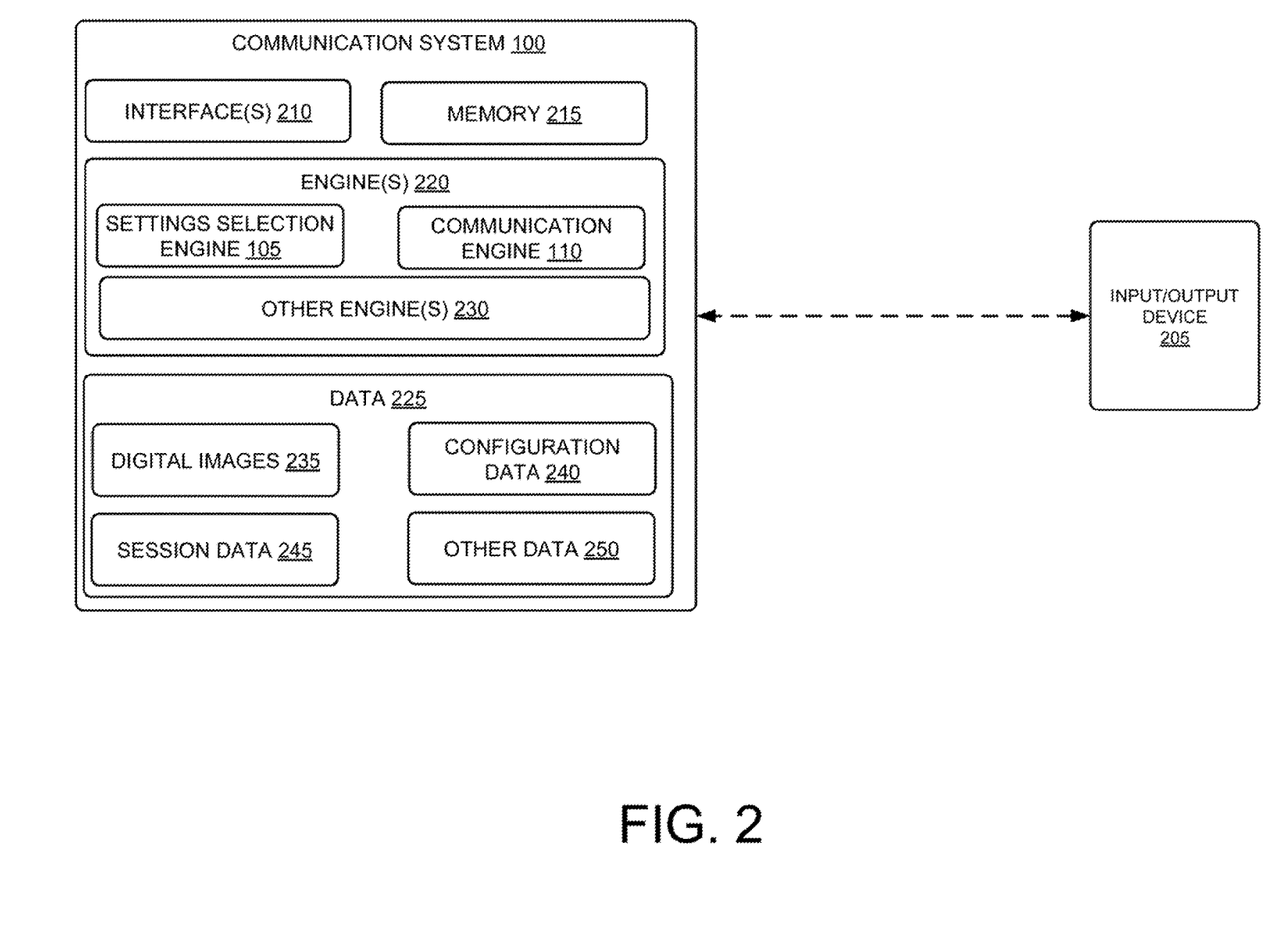
FIG. 2 illustrates another block diagram of the communication system, according to an example implementation of the present subject matter.

The above aspects and further details are provided in conjunction with FIG. 2. FIG. 2 illustrates a block diagram of the communication system 100, according to another example implementation of the present subject matter. In FIG. 2, the computing system 100 may be implemented as a standalone computing system communicatively connected through a network to other devices. In other examples, the computing system 100 may be integrated with other systems, such as a printer, a copier, a scanner, a facsimile machine, a server with an associated facsimile unit, and/or any other type of computing device.

The communication system 100 may be further coupled or may be in communication with an input/output device 205, such as a scanner and a printer. Although the input/output device 205 is depicted as being as being separate from the communication system 100, the input/output device 205 may also be integrated within the communication system 100 without deviating from the scope of the present subject matter.

In the present example, the communication system 100 includes interface(s) 210, memory 215, engine(s) 220, and data 225. The interface(s) 210 may include a variety of interfaces, for example, interfaces for data input and output devices, referred to as I/O devices, storage devices, network devices, and the like. The interface(s) 210 facilitate communication between the communication system 100 and various computing devices connected in a networked environment, or also with the input/output device 205.

The memory 215 may store one or more computer-readable instructions, which may be fetched and, executed so as to implement functionalities of the engine(s) 220. The memory 215 may be any non-transitory computer-readable medium including, for example, volatile memory such as RAM, or non-volatile memory such as EPROM, flash memory, and the like.

The communication system 100 may further include engine(s) 220 and data 225. The engine(s) 220 may be implemented as a combination of hardware and programming (for example, programmable instructions) to implement one or more functionalities of the engine(s) 220. In examples described herein, such combinations of hardware and programming may be implemented in a number of different ways. For example, the programming for the engine(s) 220 may be processor executable instructions stored on a non-transitory machine-readable storage medium, and the hardware for the engine(s) 220 may include a processing resource (for example, one or more processors), to execute such instructions. In the present examples, the machine-readable storage medium may store instructions that, when executed by the processing resource, implement engine(s) 220. In such examples, the communication system 100 may include the machine-readable storage medium storing the instructions and the processing resource to execute the instructions, or the machine-readable storage medium may be separate but accessible to communication system 100 and the processing resource. In other examples, engine(s) 220 may be implemented by electronic circuitry.

In an example, the engine(s) 220 include a settings selection engine 105, a communication engine 110, and other engine(s) 230. The other engine(s) 230 may implement functionalities that supplement applications or functions performed by the communication system 100. The data 225 includes data that is either predefined or generated as a result of the functionalities implemented by any of the engine(s) 220. In one example, the data 225 may include digital image(s) 235, configuration data 240, session data 245, and other data 250.

The document or content to be communicated may be obtained as a digital image using the input/out device 205. The digital image may be, for instance, a digital representation of a print media with the content which is to be transmitted. In another example, if the communication system 100 is to receive data, the input/output device 205 may be a printer to print the digital image of the document and provide a printed document corresponding to the original document. The digital image to be transmitted or received may be stored in the digital images 235.

Returning to the functioning of the communication system 100, to send or receive data, the communication system 100 may establish a communication channel using the communication parameters having certain values. The communication parameters define the characteristics of the communication channel to be established. Examples of the communication parameters includes the transmission rate and the ECM.

In case the communication channel so established provides for successful data communication, the same parameters may be used in subsequent call sessions too. However, in case a communication error is received for a current call session, the communication system 100 may alter the communication parameters to have successful data communication in a call session subsequent to the call session for which the communication error us received. The alteration of the communication parameters is explained in detail in subsequent paragraphs.

In an example, on receiving a communication error for a call session, the settings selection engine 105 may ascertain whether a communication re-establish criteria is met. The communication re-establish criteria may be indicative of conditions in which the communication channel is to be re-established for a subsequent call session. For example, the communication re-establish criteria may be based on re-dial settings. Accordingly, the criteria may be met if re-dial settings are enabled. The information pertaining to re-dial settings may be stored in configuration data 240. Further, in case re-dial settings are disabled, a prompt may be provided to a user to enable the re-dial settings. Based on the user input, the re-dial settings may be enabled In another example, the communication re-establish criteria may be based on a user input indicating communication channel to be re-established and/or a predetermined number of call sessions already performed in a communication cycle to re-establish the communication channel. The communication cycle may refer to one or more call sessions that may be completed for transmitting/receiving given data. Based on network conditions, in certain communication cycles, data may transmitted/received successfully in a single call session, while in others there may be multiple call sessions. However, to prevent the communication system 100 from endlessly trying to re-establish communication channel, the number of call sessions (iterations) in a communication channel may be limited. Such a number may be stored as predetermined number of call sessions, which may be stored in configuration data 240. In such cases, where the predetermined number of call sessions is defined, the communication re-establish criteria may be said to be met, when the predetermined number of call sessions in the communication cycle are not completed yet.

Additionally, a user may also provide an input, whether the communication channel is to be re-established. For instance, in case the communication system 100 is to be receive data, the alteration of communication parameters may be performed, on receiving an input from the user. In another example, in case of data transmission, if re-dial settings are enabled and predetermined number of call sessions have yet not completed, the alteration of communication parameters may be performed for re-establishing the communication channel.

On ascertaining that the communication re-establish criteria is met, the settings selection engine 105 may fetch values of the communication parameters, such as the transmission rate and the ECM, used for a previous call session. The previous call session may be understood as the call session for which the communication error was received. For the purposes of explanation, and not as a limitation, the first attempt to establish a communication channel, i.e., prior to receiving the communication error may correspond to first call session. If the communication fails in the first call session, a second call session may be established, and the first call session may be considered as previous call session for the second call sessions. Further, the subsequent description has been explained in detail with reference to the transmission rate and the ECM; however, it will be appreciated that in addition to these two parameters other parameters may also be adjusted.

The values of communication parameters for one or more previous call sessions may be stored in the session data 245. The settings selection engine 105 may compare the obtained values of the transmission rate and the ECM with the values of these parameters defined in a predetermined setting. The predetermined setting may be stored in the configuration data 240. The predetermined setting may include such values of the communication parameters so that the subsequent values are selected to address a type of noise that may be there in the network. In an example, the predetermined setting includes allow range transmission range, such as V.29 with ECM disabled.

The subsequent alteration is based on whether the predetermined settings were used. For instance, if the predetermined settings have already been used and the communication is still not established, it may be assumed the noise may be spike noise or sudden noise. Such conditions may be addressed if a transmission rate higher than the transmission rate that is used in the predetermined settings may be used. Likewise, if the predetermined settings have not been used, the settings selection engine may determine a transmission rate lower than the transmission rate in previous session or same transmission rate with ECM state switched. The alteration of the communication parameter for data transmission and for receiving data are explained below.

Referring to case where the communication system 100 is transmitting data, on receiving the communication error, the settings selection engine 105 may determine whether the redial settings are enabled and if enabled, if the predetermined number of iterations have already completed. The details pertaining number of iterations completed and the values of communication parameters in each iteration may be stored in the session data 245. On determining that the predetermined number of iterations have not completed, the settings selection engine 105 may determine that communication re-establish criteria is met and proceed to determine values of the transmission rate and the ECM for subsequent call session.

The settings selection engine 105 may determine whether the predetermined setting, such as V.29 with ECM disabled, was used in the last call session using the session data 245. In case predetermined setting is not used, it may be determined whether the last call session used highest available transmission rate, say, V.34. If it is determined that the highest available transmission rate was used or the predetermined setting was used, for the subsequent call session (iteration), the setting selection engine 105 may select a transmission rate higher than the transmission rate of the predetermined setting and switch a state of the ECM. Further, the higher transmission rate may be a medium range transmission rate. For instance, for the subsequent call session V.17 with ECM enabled may be used.

However, in case it is determined that neither the predetermined setting nor the highest available transmission rate was used in the subsequent call session, it may be determined whether the previous two call sessions used the same transmission rate. If it is determined that the previous two call sessions did not use the same transmission rate, then for the subsequent call session, the transmission rate of previous call session, i.e., last call session is maintained, while a state of the ECM is switched. For example, if V.17 with ECM enabled is used in last call session and V.34 is used prior to that, then for the subsequent call session, V.17 with ECM disabled may be selected. Likewise, if the previous call session used V.29 with ECM enabled and V.17 with ECM disabled is used prior to that, then for the subsequent call session, V.29 with ECM disabled may be selected.

Further, if it determined that the that the previous two call sessions used the same transmission rate, then for the subsequent call session, the transmission rate lower than the transmission rate of previous call session is selected, while a state of the ECM is maintained. For example, if V.17 with ECM disabled is used in last call session and V.17 with ECM enabled is used prior to that, then for the subsequent call session, V.29 with EC disabled may be selected.

Accordingly, based on the communication parameters used in the previous call session, the communication parameters for the next call session may be determined. The determined values may be stored in the configuration data 240. In an example, the values determined may be temporary, i.e., for a predetermined time period or for a single call session. Thus, after the pre-determined time period or the completion of call session, the communication parameters may be set back to default values, which may be stored in the configuration data 240.

The communication engine 110 may then set a communication channel with determined values to facilitate communication. For instance, the communication engine 110 may gather the data from the digital images 235 and transmit over the facsimile communication network to another communication system.

Referring to the case where the communication system 100 may receive the communication error while receiving data. In an example, on receiving the communication error, the settings selection engine 105 may provide a prompt to the user to re-set the communication parameters. In case the user input indicates the communication parameters may be re-set, the setting selection engine 105 may alter the communication parameters for the subsequent call session.

To determine the communication parameters, the settings selection engine 105 may ascertain whether the previous call session used the predetermined setting, such as V.29 with ECM disabled. In case it is ascertained that the predetermined setting was used, for the subsequent call session, the setting selection engine 105 may select a transmission rate higher than the transmission rate of the predetermined setting with an ECM state switched, where the higher transmission rate is a medium range transmission rate. For instance, for the subsequent call session V.17 with ECM enabled may be used. Such a configuration may aid in addressing sudden or spike noise.

However, in case the predetermined setting is not used, the communication parameters may be set to the values of the communication parameters in the predetermined setting. For example, if V.34 was used in the previous call session, which may be understood to be the current settings, the settings selection engine 105 may select V.29 with ECM disabled for the subsequent call session. Likewise, if the previous call session, i.e., current call settings, uses V.17 as transmission rate or V.29 with ECM enabled, for the subsequent call session, V.29 with ECM disabled may be used. The disabling of ECM may prevent the communication procedure from timing out and addressing flat noise, thereby facilitating successful communication.

In an example, the determined values of the communication parameters may be permanent, i.e., may be retained until changed by a user. Thus, in case of data transmission, the configuration of the communication parameters may be temporarily, while during data receiving the configuration may be sticky.

Based on the determined values of the communication parameters, the communication engine 110 may establish a communication channel to receive data. Further, the received data may be stored in the digital images 235, which may later be printed using the output device 205.

Thus, the present subject matter provides for real-time alteration of the communication parameters to establish communication using a facsimile communication environment. Further, the present subject matter is easy to implement with no hardware changes, thereby making it cost-effective and enhancing user experience.

Methods 300-700 are described in FIGS. 37, respectively, for facilitating communication in a facsimile communication environment, according to an example implementation of the present subject matter. The order in which the methods 300, 400, 500, 600, and 700 are described is not intended to be construed as a limitation, and any number of the described method blocks can be combined in any appropriate order to execute the methods 300, 400, 500, 600, and 700 or an alternative method. Additionally, individual blocks may be deleted from the methods 300, 400, 500, 600, and 700 without departing from the spirit and scope of the subject matter described herein.

The methods 300, 400, 500, 600, and 700 can be performed by programmed computing devices, for example, based on instructions retrieved from non-transitory computer readable media. The computer readable media can include machine-executable or computer-executable instructions to perform all or portions of the described method. The computer readable media may be, for example, digital memories, magnetic storage media, such as a magnetic disks and magnetic tapes, hard drives, or optically readable data storage media.

The methods 300, 400, 500, 600, and 700 may be performed by a computer based system, such as the communication system 100. For the sake of brevity of description of FIG. 3, FIG. 4, FIG. 5, FIG. 6 and FIG. 7, the components of the communication system 100 performing the various steps of the methods 300, 400, 500, 600, and 700 are not described in detail with reference to FIG. 3, FIG. 4, FIG. 5, FIG. 6 and FIG. 7. Such details are provided in the description provided with reference to FIGS. 1-2.

Figure 3:
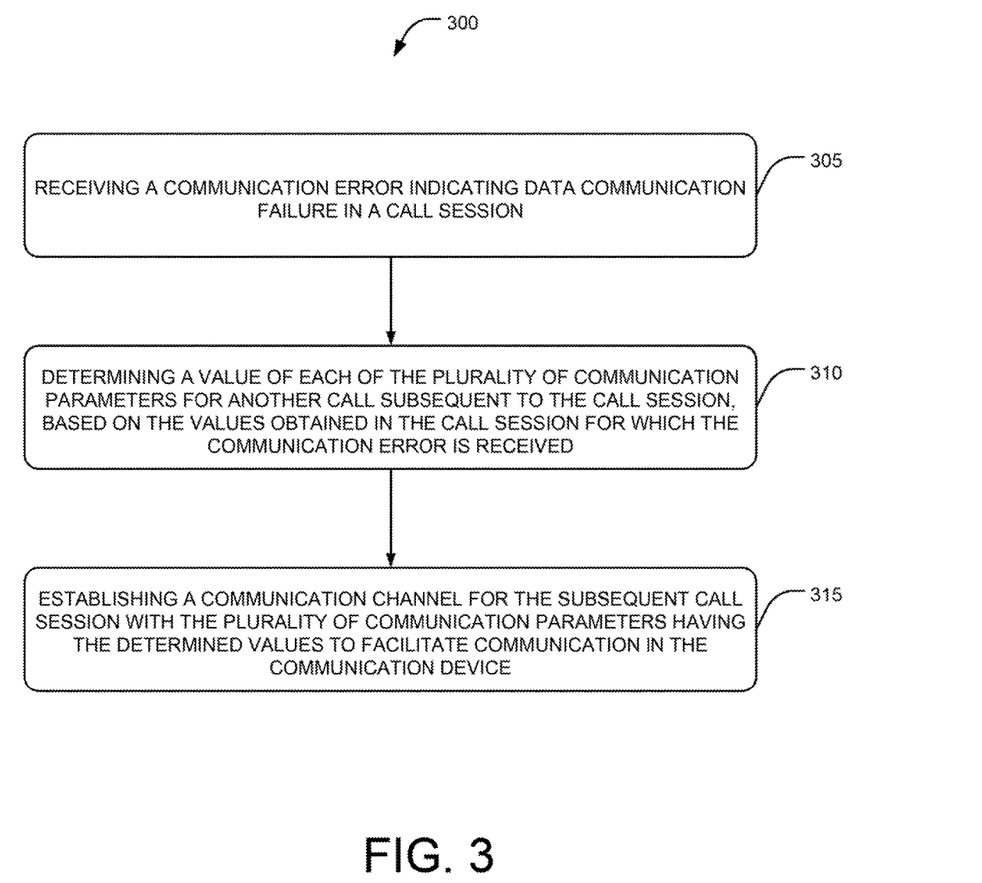
FIG. 3 illustrates a method to facilitate communication in a communication system, according to an example implementation of the present subject matter.

Referring to FIG. 3, at block 305, a communication error indicating communication error indicating data communication failure in call session may be received. In an example, the settings selection engine 105 may receive the communication error. On receiving the error, the settings selection engine 105 may obtain the values of the communication parameters if a communication re-establish criteria is met. The communication re-establish criteria may be based on re-dial settings, number of call sessions completed in a communication cycle, or a user input At block 310, a value of each of the plurality of communication parameters for another call session subsequent to the call session of block 305 (previous call session) may be determined. The values may be determined, based on the values of the communication parameters in a previous call session(s). Examples of the communication parameters may include a transmission rate and an error correction mode (ECM). In an example, the settings selection engine 105 may determine the value of the communication parameters for the subsequent call session. Further, the value may be determined based on the values in the previous call session(s) and, a predetermined setting.

At block 315, a communication channel for the subsequent call session with the plurality of communication parameters having the determined values may be established to facilitate facsimile communication in the communication system. In an example, the communication engine 110 may establish the communication channel for the subsequent call session.

Figure 4:
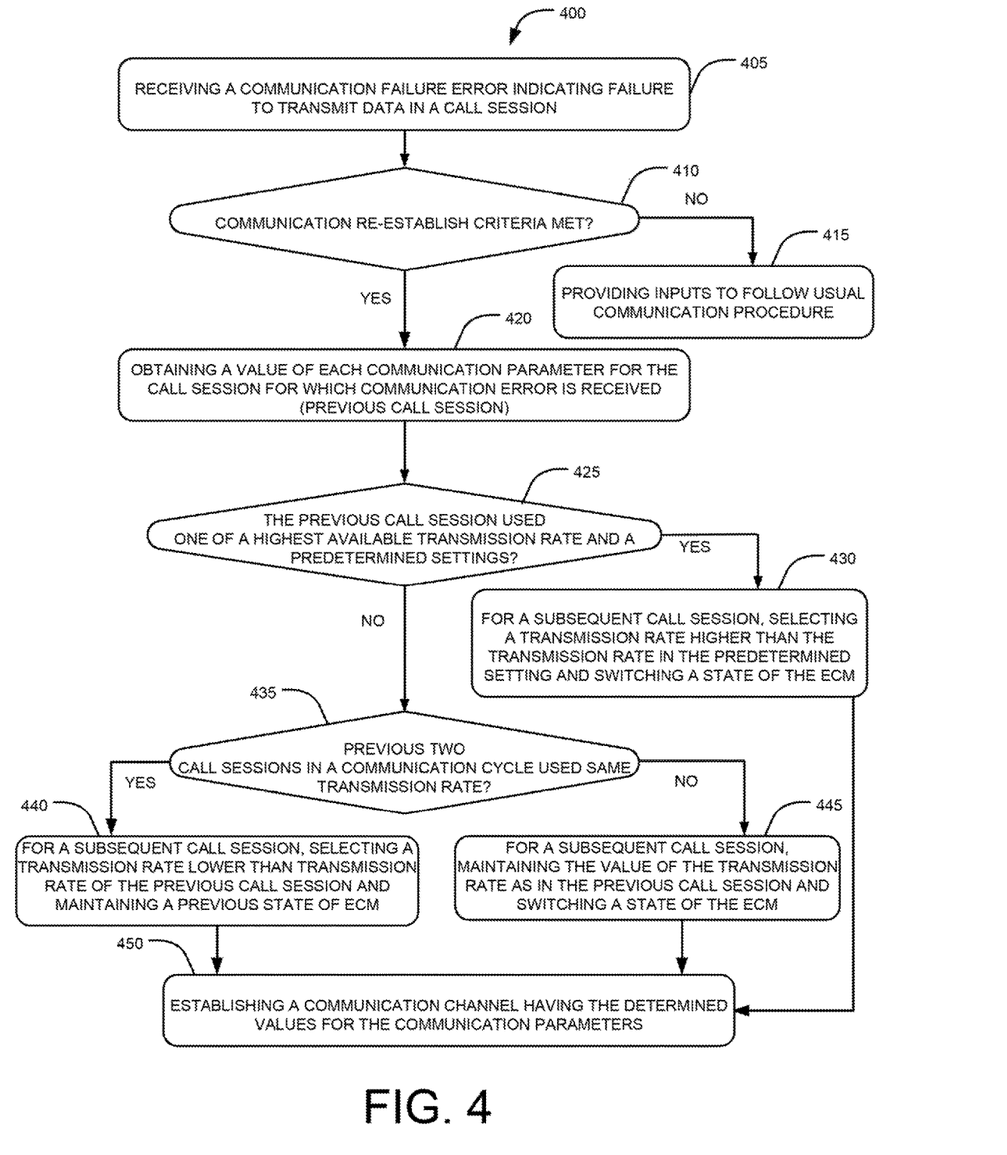
FIG. 4 illustrates a method to facilitate data transmission in a communication system, according to an example implementation of the present subject matter

Referring to FIG. 4, the method 400 describes the method 400 for facilitating data transmission in a communication system, such as the communication system 100, according to an example implementation of the present subject matter.

At block 405, a communication error indicating data transmission failure in a call session may be received. In an example, the settings selection engine 105 may receive the communication error.

At block 410, on receiving the communication error, it may be ascertained whether the communication re-establish criteria is met. For instance, the communication re-establish criteria may be based on re-dial settings and the predetermined number of call sessions in a communication cycle. The communication re-establish criteria may be met when the re-dial settings are enabled and the predetermined number of call sessions have not completed. In an example, the settings selection engine 105 may ascertain whether the communication re-establish criteria is net.

In case it is ascertained that the communication re-establish criteria is not met ('No' path from block 410), usual communication procedure may be followed (block 415).

However, if it is ascertained that the communication re-establish criteria is met ('Yes' path from block 410), the method 400 may proceed to determine values of the communication parameters for another call session subsequent to the call session of block 405. For the purpose, the method 400 may proceed to block 420.

At block 420, values of the communication parameters for the call session may be obtained. In an example, the value of the communication parameters for one or more call sessions in a communication cycle may be obtained.

At block 425, it may be ascertained whether a predetermined setting was used in the previous call session, i.e., the call session of block 405. The predetermined setting may include such value of transmission rate and the ECM that type of noise is factored in while determining the values of the communication parameter for a subsequent call session. In an example, the predetermined setting may include a low range transmission rate, such as V.29, with ECM disabled. In an example, the settings selection engine 105 may obtain values and ascertain whether the predetermined setting was used.

If it is ascertained that the predetermined setting was used ('Yes' branch), then the method 400 may branch to block 430. At block 430, a transmission rate higher than the transmission rate of the predetermined setting may be selected. Further, a state of the ECM as in the predetermined setting may be switched. For instance, the ECM may be enabled, in case it was previously disabled.

However, if it is ascertained that the predetermined setting was not used ('No' branch), the method 400 may proceed to block 435. At block 435, it may be ascertained whether the same transmission rate was used in previous two call sessions in a communication cycle. If at block 435, it is ascertained that same transmission rate was used ('Yes' branch), the method 400 may branch to block 440.

At block 440, for a subsequent call session, a transmission rate lower than the transmission rate in the previous call session, i.e., last call session may be selected. Further, a state of the ECM may be maintained.

However, if at block 440, it is ascertained that the same transmission rate was not used ('No' branch), the method 400 may proceed to block 445. At block 445, for the subsequent call session, the transmission rate of the previous call session may be maintained, while a state of the ECM may be switched.

At block 450, a communication channel may be established using the determined values of the communication parameters. Further determined values may be temporary and the communication parameters may be set back to default values after a predetermined time period or after completion of the call session.

Figure 5:
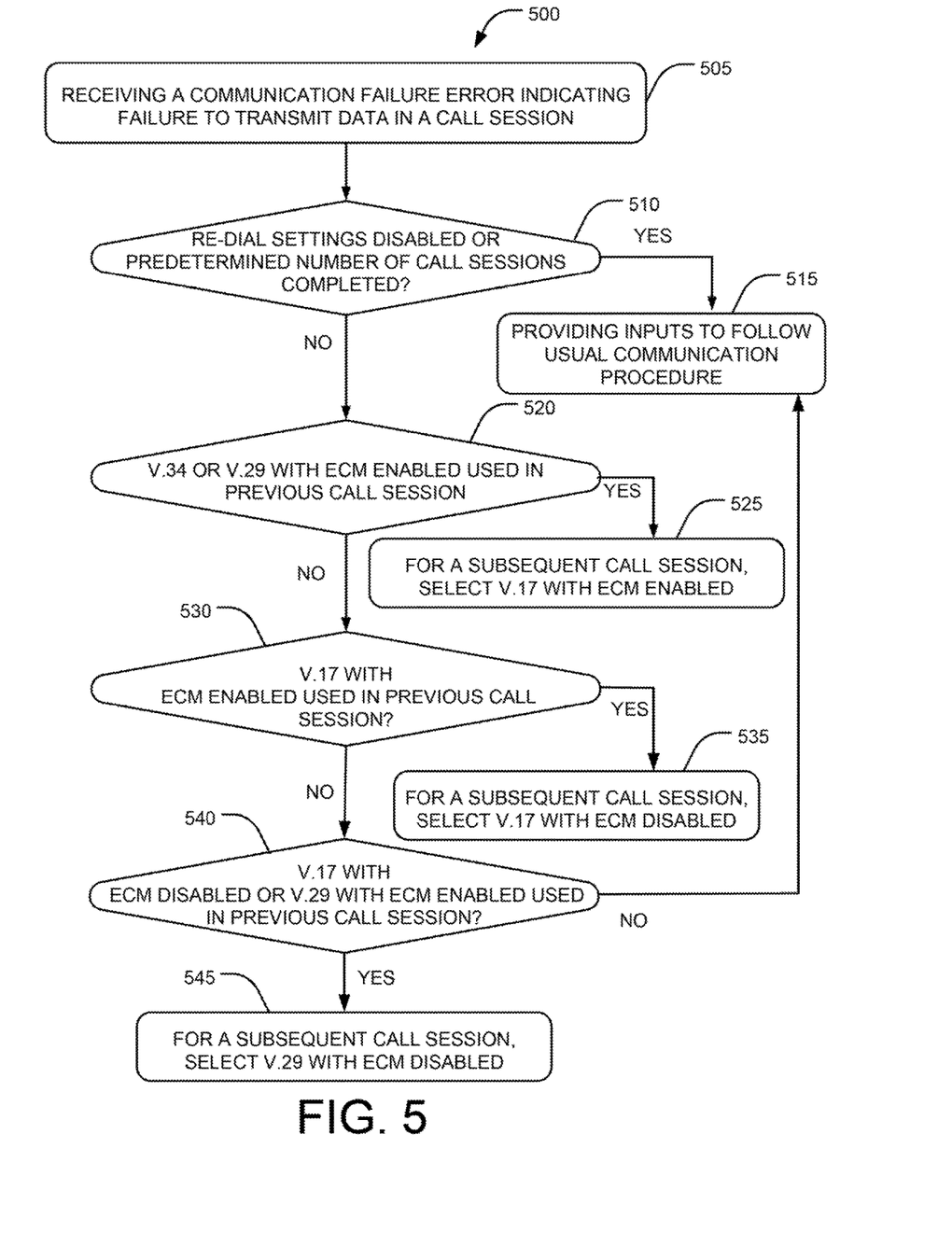
FIG. 5 illustrates another method to facilitate data transmission in a communication system, according to an example implementation of the present subject matter.

Referring to FIG. 5, the method 500 describes an example implementation of method 400. In the present example implementation, V.34 is the highest available transmission rate and V.29 with ECM disabled is the predetermined setting.

At block 505, a communication error indicating data transmission failure in a call session may be received.

At block 510, it may be ascertained whether the re-dial settings are disabled and predetermined number of call sessions in a communication cycle have been completed. In case it is ascertained that re-dial settings are disabled or the predetermined number of call sessions have completed ('Yes' branch), the method 500 may branch to block 515.

At block 515, a usual communication, procedure may be followed.

However, if at block 510, it is ascertained that re-dial settings are enabled and the predetermined number of call sessions have not yet completed ('No' branch), the method 500 may branch to block 520, where values of the communication parameters for a subsequent call session may be determined.

At block 520, it may be determined whether a previous call session used V.34 or V.29 with ECM disabled. If the previous call session used one of V.34 or V.29 with ECM disabled ('Yes' branch), then at block 525, V.17 with ECM enabled may be selected for a subsequent call session. It will be appreciated that V.17 provides faster data transmission as compared V.29, and may be considered as a medium range transmission rate.

However, if at block 520, it may be determined that V.34 or V.29 with ECM disabled is not used ('No' branch), then at block 530, it is ascertained whether the previous call session used V.17 with ECM enabled.

If at block 530, it is ascertained that the previous call session used V.17 with ECM enabled ('Yes' branch), then at block 535, the V.17 with ECM disabled is selected. Thus, as the previous two call sessions did not use the same transmission rate, V.17, for the subsequent call session V.17 is used but the ECM state is switched.

If at block 530, it is ascertained that the previous call session did not use V.17 with ECM enabled ('No' branch), then at block 540, it is ascertained whether the previous call session used V.17 with ECM disabled or V.29 with ECM enabled.

At block 540, if it is ascertained that the previous call session used V.17 with ECM disabled or V.29 with ECM enabled ('Yes' branch), then at block 545, V.29 with ECM disabled is selected. Thus, in case the previous call session used V.17 with ECM disabled and the call session prior to that used V.17 with ECM enabled, then for the subsequent call session, V.29 (lower transmission rate) with ECM disabled is selected. Likewise, if the previous call session used V.29 with ECM enabled, then for the subsequent call session, the transmission rate, V.29, is maintained and the state of the ECM is switched.

If at block 540 it is ascertained that the previous call session did not used V.17 with ECM disabled or V.29 with ECM enabled, then the method 500 may branch back to block 515.

Based on the determined values the communication channel for the next call session may be set.

Figure 6:
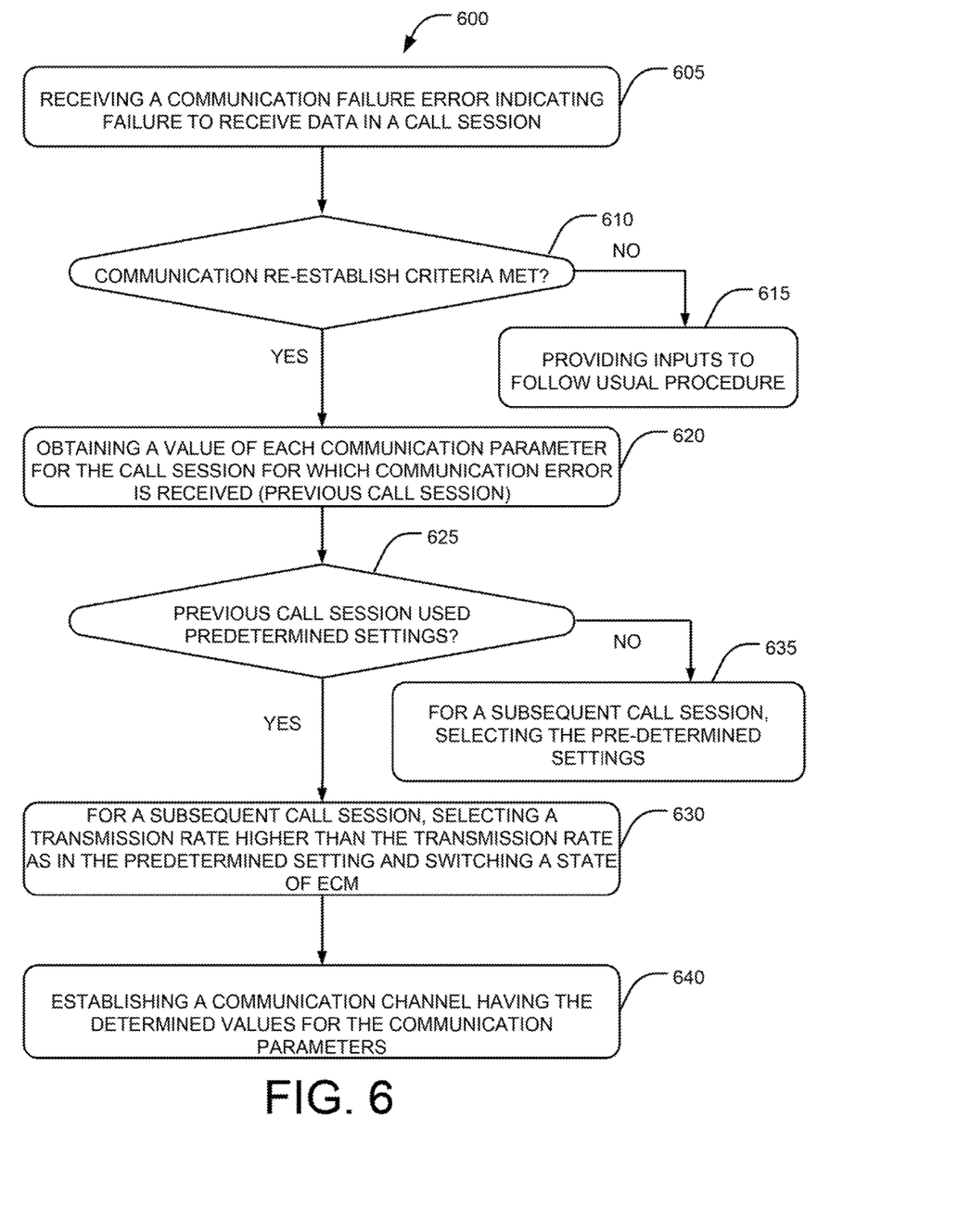
FIG. 6 illustrates a method to facilitate receipt of data in a communication system, according to another example implementation of the present subject matter.

Referring to FIG. 6, the method 600 describes a method to facilitate receiving of data in a facsimile environment, according to an example implementation of the present subject matter.

At block 605, a communication error indicating failure to receive data in a call session may be received. In an example, the settings selection engine 105 may receive the communication error.

At block 610, on receiving the communication error, it may be ascertained whether the communication re-establish criteria is met. For instance, a user may provide an input to re-establish the communication channel. In an example, the settings selection engine 105 may ascertain whether the communication re-establish criteria is met, based on user input.

In case it is ascertained that the communication re-establish criteria is not met ('No' branch), the method 600 may branch to block 615, where usual communication procedure may be followed. However, if it is ascertained that the communication re-establish criteria is met ('Yes' branch), the method 600 may proceed to determine values of the communication parameters for another call session subsequent to the call session of block 605. For the purpose, the method 600 may proceed to block 620.

At block 620, values of the communication parameters for the call session may be obtained.

At block 625, it may be ascertained whether a predetermined setting was used in the previous call session, i.e., call session of block 605. The predetermined setting may include such value of transmission rate and the ECM that type of noise is factored in while determining the values of the communication parameter for a subsequent call session. In an example, the predetermined setting may include a low range transmission rate, such as V.29, with ECM disabled. In an example, the settings selection engine 105 may obtain values and ascertain whether the predetermined setting was used.

If it is ascertained that the predetermined setting was used ('Yes' branch), then the method 600 may branch to block 630. At block 630, a transmission rate higher than the transmission rate of the predetermined setting may be selected. Further, a state of the ECM as in the predetermined setting may be switched. For example, if the predetermined setting is V.29 with ECM disabled, then at block 630, V.17 with ECM enabled may be selected. Thus, higher transmission rate with ECM enabled or ECM state switched may be selected.

However, if it is ascertained that the predetermined setting was not used ('No' branch), the method 600 may proceed to block 635. At block 635, for the subsequent call session, the communication parameters as in the predetermined setting may be selected. For example, if the previous call session used V.34, V.17 with ECM enabled/disabled, or V.29 with ECM enabled, then V.29 with ECM disabled may be selected. In an example, the settings selection engine 105 may ascertain and select the values of the communication parameters for the subsequent call session.

At block 640, a communication,channel may be, established using the determined values of the communication parameters In an example, determined values may be permanent or sticky, and the values may be retained until reconfigured.

Figure 7:
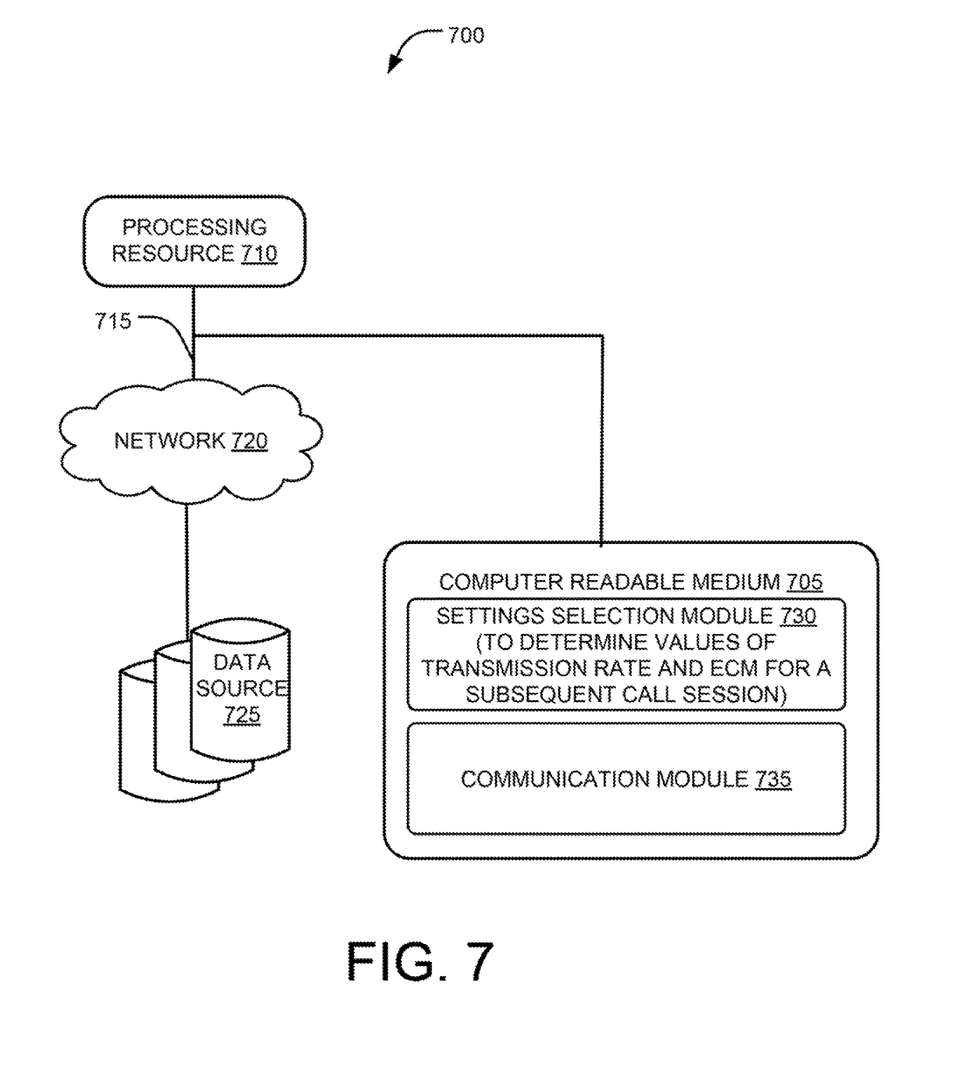
FIG. 7 illustrates a network environment to facilitate communication in a communication system, according to an example implementation of the present subject matter.

FIG. 7 illustrates an example network environment 700 using a non-transitory computer readable medium 705 for facilitating facsimile communication, according to an example implementation of the present subject matter. The network environment 700 may be a public networking environment or a private networking environment. In one example, the network environment 700 includes a processing resource 710 communicatively coupled to the non-transitory computer readable medium 705 through a communication link 715.

For example, the processing resource 710 can be a processor of a computing system, such as the system 100. The non-transitory computer readable medium 705 can be, for example, an internal memory device or an external memory device. In one example, the communication link 715 may be a direct communication link, such as one formed through a memory read/write interface. In another example, the communication link 715 may be an indirect communication link, such as one formed through a network interface. In such a case, the processing resource 710 can access the non-transitory computer readable medium 705 through a network 720. The network 720 may be a single network or a combination of multiple networks and may use a variety of communication protocols.

The processing resource 710 and the non-transitory computer readable medium 705 may also be communicatively coupled to data sources 725 over the network 720. The data sources 725 can include, for example, databases and computing devices. The data sources 725 may be used by the database administrators and other users to communicate with the processing resource 710.

In one example, the non-transitory computer readable medium 705 includes a set of computer readable instructions such as a settings selection module 730 and a communication module 735. As would be understood, the settings selection module 730 implements the functionality of the setting selection engine 105 and the communication module 735 implements the functionality of the communication engine 110. The set of computer readable instructions, referred to as instructions hereinafter, can be accessed by the processing resource 710 through the communication link 715 and subsequently executed to perform acts for facilitating facsimile communication.

For discussion purposes, the execution of the instructions by the processing resource 710 has been described with reference to various components introduced earlier with reference to the description of FIGS. 1-2.

On execution by the processing resource 710, the settings selection engine 105, on receiving an input indicating receipt of a communication error for a call session, may determine a value of each communication parameters for a subsequent call session. The value of the communication parameters may be determined, based on a value of the corresponding communication parameters in a previous call session(s), i.e., the session for which the communication error is received. The example of communication parameters includes a transmission rate and an ECM. Further, the communication engine 110 may provide control instructions to establish a communication channel for the subsequent call session with the communication parameters having the determined values to facilitate communication in a communication system, such as the communication system 100.

Although examples for facilitating facsimile communication have been described in language specific to structural features and/or methods, it is to be understood that the appended claims are not limited to the specific features or methods described. Rather, the specific features and methods are disclosed as examples for facilitating facsimile communication.

I claim:

1. A method comprising:
   receiving a communication error indicating failure to establish a communication channel for a call session;
   determining a value of each of a plurality of facsimile communication parameters for another call session subsequent to the call session, based on values of the plurality of facsimile parameters in the call session for which the communication error is received, the plurality of facsimile communication parameters comprising a transmission rate and an error correction mode (ECM), and wherein the determined value of the transmission rate is greater than a value of the transmission rate in the call session in which the communication error is received, when the transmission rate and ECM have particular predefined values in the call session in which the communication error is received; and
   establishing a communication channel for the subsequent call session with the plurality of facsimile communication parameters having the determined values to facilitate facsimile communication.

2. The method as claimed in claim 1, wherein determining the value of each of the plurality of facsimile communication parameters is based on:
   ascertaining whether a communication re-establish criteria is met, the communication re-establish criteria being based on one of a re-dial setting of the communication system, a number of call sessions completed to re-establish communication channel in a communication cycle, and a user provided input to configure the plurality of the facsimile communication parameters.

3. The method as claimed in claim 1, wherein for the subsequent call session being for data transmission, determining the value of each of the plurality of the communication parameters by,
   ascertaining, whether a previous call session used one of a highest available transmission rate and a predetermined setting, the previous call session being the call session for which the communication error is received, wherein the predetermined setting comprises a low range transmission rate;
   when the previous call session used one of the highest available transmission rate and the predetermined setting, for the subsequent call session, selecting a transmission rate higher than the transmission rate of the predetermined setting and enabling the ECM.

4. The method as claimed in claim 3, wherein, when the previous call session did not use one of the highest available transmission rate and the predetermined setting, the value of the plurality of facsimile communication parameters is determined by:
   ascertaining whether the transmission rate in previous two call sessions in a communication cycle was same; and
   when the transmission rate is same in the previous two call sessions, for the subsequent call session, selecting a transmission rate lower than the transmission rate of the previous call session and maintaining a previous state of the ECM.

5. The method as claimed in claim 1, wherein when the subsequent call session is for receiving data, determining the value of each of the plurality of facsimile communication parameters by:
   ascertaining whether a previous call session used a predetermined setting, the previous call session being the call session for which the communication error is received, wherein the predetermined setting comprises a low range transmission rate; and
   when the previous call session did not use the predetermined setting, selecting the predetermined setting for the subsequent call session.

6. The method as claimed in claim 5, wherein, when the previous call session used predetermined setting, the values of the plurality of facsimile communication parameters are determined by:
   selecting a transmission rate higher than the transmission rate in the predetermined setting and enabling the ECM for the subsequent call session.

7. A communication system comprising,
   a settings selection engine to,
   obtain, on receiving a communication error for a call session, a value of each of a plurality of facsimile communication parameters for the call session, the plurality of facsimile communication parameters comprising a transmission rate and an ECM; and
   determine a value of each of a plurality of facsimile communication parameters for another call session subsequent to the call session, wherein the values are determined based on the obtained value of a corresponding communication parameter, and wherein the determined value of the transmission rate, when the transmission rate and ECM have particular predefined values in the call session having the communication error, is greater than a value of the transmission rate in the call session for which the communication error is received; and a communication engine to establish a communication channel with the determined values of the plurality of facsimile communication parameters.

8. The communication system as claimed in claim 7, wherein the settings selection engine is to:

ascertain, on receiving the communication error, whether a communication re-establish criteria is met, the communication re-establish criteria being based on one of a re-dial setting of the communication system, a number of call sessions completed to re-establish communication channel in a communication cycle, and a user provided input to configure the plurality of facsimile communication parameters, and determine the value of each of the plurality of facsimile communication parameters, when the communication re-establish criteria is met.

9. The communication system as claimed in claim 7, wherein when the subsequent call session is for data transmission, the settings selection engine is to:

ascertain whether a previous call session used one of a highest available transmission rate and a predetermined setting, the previous call session being the call session for which the communication error is received, wherein the predetermined setting comprises a low range transmission rate; and when the previous call session used one of the highest available transmission rate and the predetermined setting, for the subsequent call session, select a transmission rate higher than the transmission rate of the predetermined setting and enable the ECM.

10. The communication system as claimed in claim 9, wherein, when the previous call session did not use one of the highest available transmission rate and the predetermined setting, the settings selection engine is to:

ascertain whether the transmission rate in previous two call sessions in a communication cycle was same; and when the transmission rate was not same in the previous two call sessions, for the subsequent call session, maintain the transmission rate of the previous call session and switch a previous state of the ECM.

11. The communication system as claimed in claim 10, wherein when the subsequent call session is for receiving data, the settings selection engine is to, ascertain whether a previous call session used a predetermined setting, the previous call session being the call session for which the communication error is received, wherein the predetermined setting comprises a low range transmission rate; and when the previous call session did not use the predetermined setting, select the predetermined setting for the subsequent call session.

12. The communication system as claimed in claim 11, wherein, when the previous call session used the predetermined transmission rate, the settings selection engine is to:

select a transmission rate higher the transmission rate of the predetermined setting with ECM enabled for subsequent call session.

13. A non-transitory computer readable medium having a set of computer readable instructions that, when executed, cause a processor to:

determine, on receipt of a communication error in a previous call session, a value of each of a plurality of facsimile communication parameters for a subsequent call session, based on a value of a corresponding communication parameter in the previous call session, the plurality of facsimile communication parameters comprising a transmission rate and an ECM, wherein the determined value of the transmission rate is set greater than a value of the transmission rate in the previous call session when the transmission rate and the ECM have particular predefined values in the previous call session; and provide control instructions to establish a communication channel for the subsequent call session with the plurality of facsimile communication parameters having the determined values to facilitate communication in a communication system.

14. The computer readable medium as claimed in claim 13, wherein the computer readable instructions, when executed, further cause the processor to, determine, when the subsequent call session is for data transmission, ascertain whether the previous call session used one of V.34 and V.29 with the ECM disabled as the transmission rate;

when the previous call session used V.34 as transmission rate, select V.17 as the transmission rate and enable the ECM, for the subsequent call session;

when the previous call session used V.29 as the transmission rate with the ECM disabled, select V.17 as the transmission rate and enable the ECM, for the subsequent call session;

when the previous call session did not use V.34 as the transmission rate, determine whether the previous call session used V.17 as the transmission rate with ECM enabled;

when the previous call session used V.17 as the transmission rate with ECM enabled, select V.17 as the transmission rate with the ECM disabled, for the subsequent call session;

when the previous call session did not use V.17 as the transmission rate with the ECM enabled, determine whether the previous call session used one of settings, V.17 as the transmission rate with the ECM disabled, and V.29 as the transmission rate with the ECM enabled;

when the previous call session used one of the settings, select V.29 as the transmission rate with the ECM enabled, for the subsequent call session.

15. The computer readable medium as claimed in claim 13, wherein the computer readable instructions, when executed, further cause the processor to, when the previous call session used V.34 as the transmission rate, select V.29 as the transmission rate with the ECM disabled for the subsequent call session for receiving data;

when the previous call session used V.17 as the transmission rate, select V.29 as the transmission rate and with the ECM disabled for the subsequent call session for receiving data;

when the previous call session used V.29 as the transmission rate with the ECM enabled, select V.29 as the transmission rate with the ECM disabled for the subsequent call session for receiving data; and when the previous call session used V.29 as the transmission rate with the ECM disabled, select V.17 as the transmission rate with the ECM enabled for the subsequent call session for receiving data.

* * * * *